United States Patent [19]
Enright

[11] Patent Number: 5,915,503
[45] Date of Patent: Jun. 29, 1999

[54] BRAKE ROD HAVING A BENDING MODE COULOMB DAMPER

[75] Inventor: John J. Enright, Troy, Ohio

[73] Assignee: The B.F. Goodrich Company, Richfield, Ohio

[21] Appl. No.: 08/559,354

[22] Filed: Nov. 16, 1995

[51] Int. Cl.⁶ .................................................. B65H 59/10
[52] U.S. Cl. .......................... 188/67; 188/130; 267/201; 267/281
[58] Field of Search .............................. 188/67, 2 A, 381, 188/125, 130, 148, 149; 267/201, 214, 215, 280, 281, 282, 134

[56] References Cited

U.S. PATENT DOCUMENTS

| | | |
|---|---|---|
| 1,584,485 | 5/1926 | Stille . |
| 2,205,138 | 6/1940 | Gould . |
| 2,469,167 | 5/1949 | Little . |
| 2,500,751 | 3/1950 | Halfvarson . |
| 2,705,633 | 4/1955 | Potter, Jr. et al. . |
| 2,710,582 | 6/1955 | Travilla . |
| 2,724,454 | 11/1955 | Rowe . |
| 3,052,107 | 9/1962 | Kempf . |
| 3,075,406 | 1/1963 | Butler, Jr. et al. . |
| 3,144,910 | 8/1964 | Foote et al. . |
| 3,273,670 | 9/1966 | Kleinlein . |
| 3,319,484 | 5/1967 | Prest . |
| 3,357,519 | 12/1967 | Anderson et al. . |
| 3,435,919 | 4/1969 | Gularte et al. . |
| 3,486,687 | 12/1969 | Ayling . |
| 3,647,028 | 3/1972 | Platus . |
| 3,774,731 | 11/1973 | Zerb . |
| 3,857,652 | 12/1974 | Thayer . |
| 3,866,720 | 2/1975 | Wallerstein, Jr. . |
| 4,079,818 | 3/1978 | Chierici .................................. 188/207 |
| 4,272,971 | 6/1981 | Loyd et al. . |
| 4,322,062 | 3/1982 | Aleck ...................................... 267/154 |
| 4,347,042 | 8/1982 | Holdsworth . |
| 4,347,043 | 8/1982 | Morris . |
| 4,479,461 | 10/1984 | Felice et al. . |
| 4,526,047 | 7/1985 | Yang . |
| 4,585,096 | 4/1986 | Bok ....................................... 188/73.37 |

(List continued on next page.)

FOREIGN PATENT DOCUMENTS

| | | |
|---|---|---|
| 2995577 | 4/1979 | Australia . |
| 3740756 A1 | 2/1987 | Germany . |
| 4419691 C1 | 4/1994 | Germany . |
| 3288041 | 12/1991 | Japan . |
| 9313333 | 8/1993 | WIPO . |

OTHER PUBLICATIONS

European Search Report EP 96 11 7488, Dated Jun. 16, 1998, 96117488.5-2312. Sg-ss 961942 EP.

Barrie Mann, Enidine Inc., Orchard Park, NY, "A Passive Approach To Taming Vibration", *Machine Design*, Sep. 28, 1995 issue, pp. 94, 97 & 101.

Werner Soedel, Purdue University, "Shell Vibrations Without Mathematics, Part II: Advanced Considerations," *Sound and Vibration*, Apr. 1976 issue, pp. 12–13.

*Primary Examiner*—Josie Ballato
*Assistant Examiner*—Pamela J. Lipka
*Attorney, Agent, or Firm*—Kevin L. Leffel

[57] ABSTRACT

The invention relates to the field of braking systems, particularly those braking systems that utilize linkages to transmit brake-generated loads from a wheel and brake assembly to a braked vehicle. According to an aspect of the invention, a damped brake rod is provided for attachment to a structure, the structure having at least one wheel and brake assembly. The damped brake rod comprises a rod-like member for attachment to the brake assembly and the structure to resist rotation of the brake assembly relative to the structure, and a bending mode coulomb damper attached to the brake rod that damps cyclic bending mode movement of the rod-like member during braking. The bending mode coulomb damper bears essentially only cyclic loads induced by cyclic bending mode movement of the rod-like member generated during braking. A method of damping a brake rod is also provided.

39 Claims, 9 Drawing Sheets

U.S. PATENT DOCUMENTS

| | | |
|---|---|---|
| 4,593,889 | 6/1986 | Odobasic . |
| 4,799,653 | 1/1989 | Kramer . |
| 4,822,245 | 4/1989 | Aubry et al. ............................ 416/134 |
| 4,825,718 | 5/1989 | Seifert et al. . |
| 4,909,361 | 3/1990 | Stark et al. . |
| 4,962,826 | 10/1990 | House . |
| 5,030,490 | 7/1991 | Bronowicki et al. . |
| 5,056,738 | 10/1991 | Mercer et al. . |
| 5,056,763 | 10/1991 | Hamada et al. . |
| 5,087,491 | 2/1992 | Barrett . |
| 5,217,184 | 6/1993 | Hararat-Tehrani ................... 244/118.1 |
| 5,326,324 | 7/1994 | Hamada . |
| 5,339,652 | 8/1994 | Dreiman . |
| 5,405,296 | 4/1995 | Cerny et al. . |
| 5,494,136 | 2/1996 | Sceisi et al. . |
| 5,501,434 | 3/1996 | McGuire . |
| 5,806,794 | 9/1998 | Hrusch et al. .......................... 244/111 |

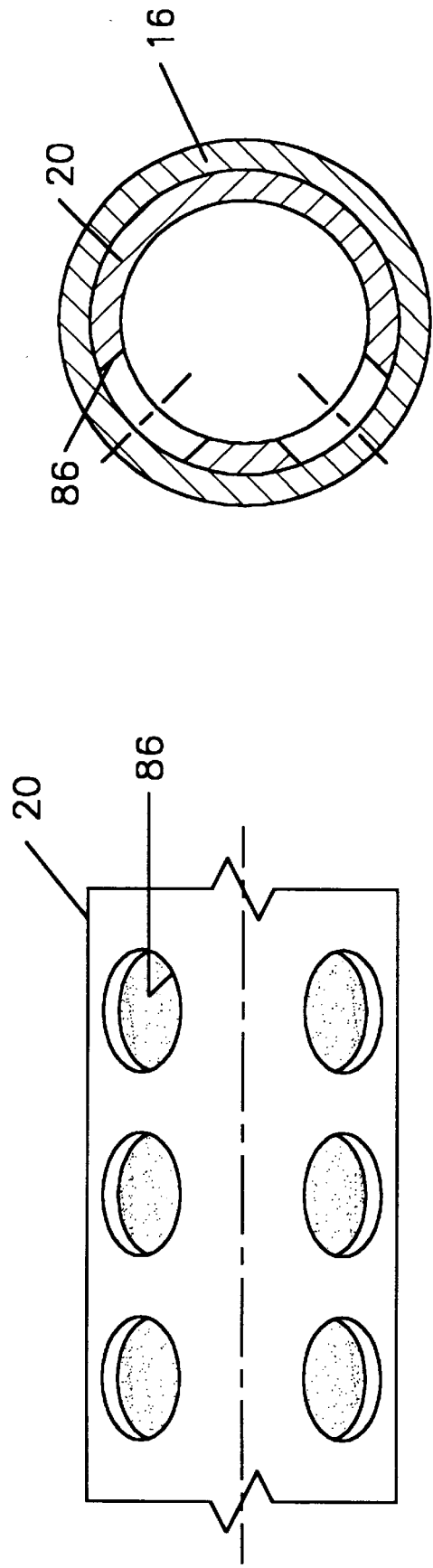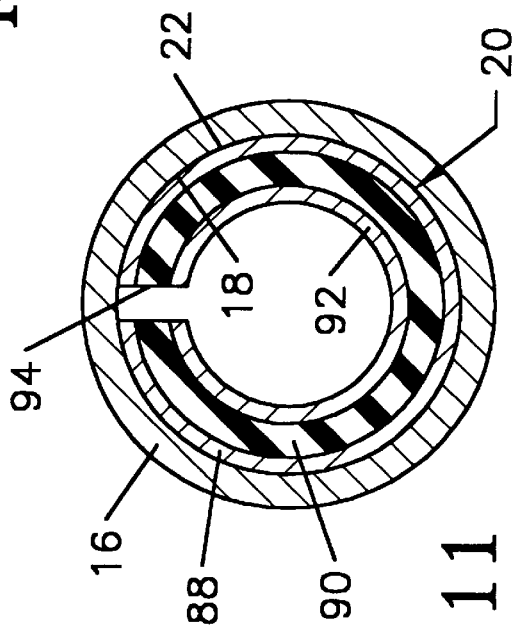

BRAKE ROD HAVING A BENDING MODE COULOMB DAMPER

BACKGROUND

The invention relates to the field of braking systems, particularly those braking systems that utilize linkages to transmit brake-generated loads from a wheel and brake assembly to a braked vehicle.

Vehicle braking systems are one of a class of mechanisms that can be induced to vibrate by the action of friction. In some situations, the vibration may become unstable and grow to levels severe enough to cause excessive noise, passenger discomfort, and/or structural failure of system components. Part of the art of designing such systems lies in increasing the stabilizing effects of damping within and between the components of the system to counteract the destabilizing effects of braking friction.

The invention applies to any member of a general class of braking systems that use linkages to transmit brake-generated loads from the wheel and brake to the braked vehicle. It is particularly useful with multi-brake aircraft landing gear systems. In such a landing gear, the wheel and brake assemblies are typically mounted in pairs on two or more tandem axles, which are in turn fixed to a "bogie" or "truck" beam that pivots about a point on the inner cylinder of the landing gear's shock strut. The brake torque generated by each of the fore and aft assemblies is reacted by forces at its axle and through a brake rod that links the brake to the inner cylinder of the landing gear at a point above or below the bogie pivot. The fore brake rods act in compression and the aft rods act in tension to transmit braking forces to the bogie. For each assembly, the rod forms one of the four links of a parallel four-bar linkage that operates in the pitch plane of the aircraft.

The dominant modes of friction-induced vibration in aircraft brakes are "squeal" (a torsional oscillation of the non-rotatable brake parts) and "whirl" (a rotating bending oscillation). During both modes of vibration, an oscillating load is superimposed on the mean compression or tension loads carried by the brake rods that may cause the rod to bend. Workers in the art have recently attempted to solve the brake vibration problem in various ways, including providing an axial coulomb damper in a brake rod. The brake rod essentially acts as a shock absorber. This solution did not prove to be entirely satisfactory.

A simple, lightweight, inexpensive, and effective solution to the brake vibration problem is generally desired.

SUMMARY OF THE INVENTION

A damped brake rod is provided for attachment to a structure, the structure having at least one wheel and brake assembly, comprising:
  a rod-like member for attachment to the brake assembly and the structure to resist rotation of the brake assembly relative to the structure; and,
  a bending mode coulomb damper attached to the brake rod that damps cyclic bending mode movement of the rod-like member during braking, the bending mode coulomb damper bearing essentially only cyclic loads induced by cyclic bending mode movement of the rod-like member generated during braking.

According to another aspect of the invention, a method is provided for inhibiting vibration in a wheel and brake assembly attached to a structure, comprising the steps of:
  resisting rotation of the brake assembly relative to the structure with a rod-like member attached to the brake assembly and the structure;
  damping cyclic bending mode movement of the rod-like member during braking with a bending mode coulomb damper attached to the brake rod, the bending mode coulomb damper bearing essentially only cyclic loads induced by cyclic bending mode movement of the rod-like member generated during braking.

According to yet another aspect of the invention, a damped brake rod is provided for attachment to a structure, the structure having at least one wheel and brake assembly, comprising:
  rod-like member means for attachment to the brake assembly and the structure and for bearing a load that resists rotation of the brake assembly relative to the structure; and,
  bending mode coulomb damper means attached to the brake rod for damping cyclic bending mode movement of the rod-like member during braking, and for bearing essentially only cyclic loads induced by cyclic bending mode movement of the rod-like member generated during braking.

BRIEF DESCRIPTION OF THE FIGURES

FIG. 9 is a side view of a section of a damping member according to an aspect of the invention.

FIG. 10 is a cross-section view of a damped member according to another aspect of the invention along line A—A of FIG. 1.

FIG. 11 is a cross-section view of a damped member according to another aspect of the invention along line A—A of FIG. 1.

DETAILED DESCRIPTION

Figure 1:
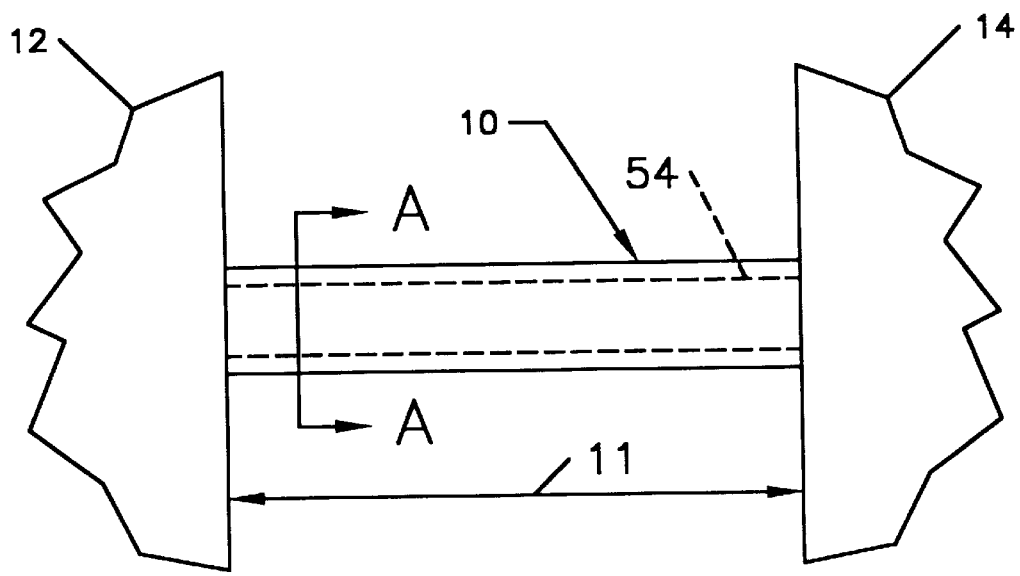
FIG. 1 is a side view of a damped member according to an aspect of the invention attached to a pair of masses.

Several embodiments illustrating various aspects of the invention are presented in FIGS. 1–13, which are not drawn to scale, and wherein like numbered components and features are numbered alike. Referring now to FIG. 1, a structural member 10 is presented that carries a load between a first mass 12 and a second mass 14. The load may place the structural member 10 in one or more of tension, compression, and torsion. The structural member 10 may be attached to the first and second masses 12 and 14 by means known in the mechanical arts, in a manner that allows the structural member 10 to carry a load between the first and second masses 12 and 14. The mode of attachment may permit or prevent relative rotation of the structural member 10 relative to the first and second masses 12 and 14, depending on type of load to be carried.

Figure 2:
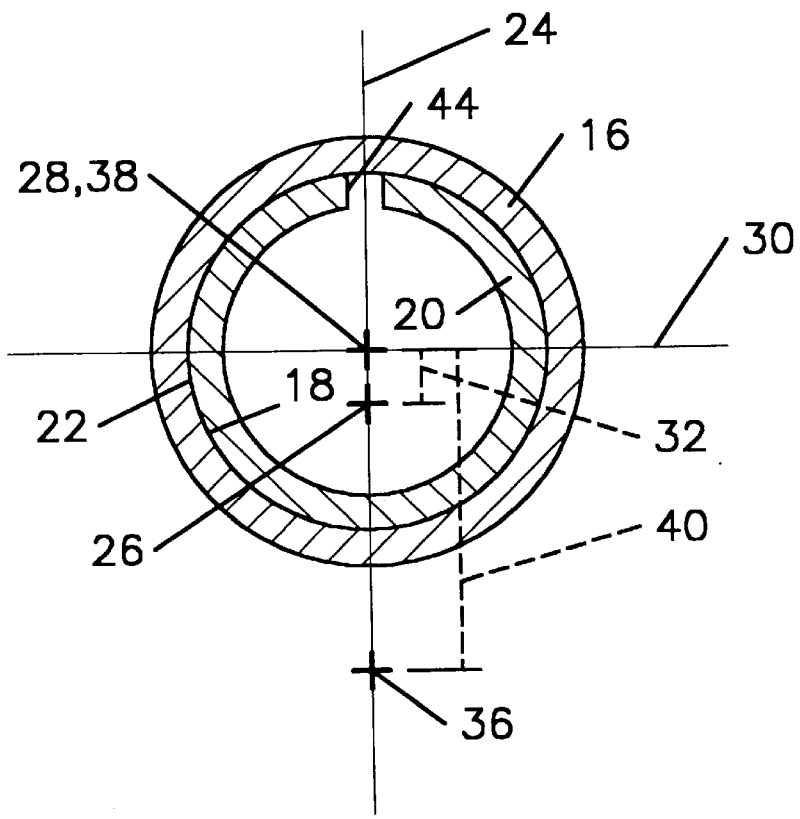
FIG. 2 is a cross-section view of a damped member according to an aspect of the invention along line A—A of FIG. 1.

Referring now to FIG. 2, a cross-sectional view of the structural member 10 along line A—A of FIG. 1 is presented. The structural member 10 comprises a load-carrying member 16 for carrying the load between the first and second masses 12 and 14, and at least one damping member 20 nested with the load-carrying member 16. The load-carrying member 16 and damping member 20 may be formed from materials typically used for structural load bearing applications, such as metals, including steel alloys and aluminum and its alloys, and fiber reinforced plastic composites, including glass fiber reinforced epoxies and carbon fiber reinforced epoxies. The materials listed are disclosed as examples of suitable materials, and it is not intended to limit the invention to a specific material. The damping member 20 may have an axial length less than, equal to, or greater than the length of the load-carrying member 16, depending on the particular application of the invention.

According to aspect of the invention, the damping member 20 and the load-carrying member 16 move relative to each other during cyclic distortion or vibration of the load-carrying member 16 thereby dissipating distortion energy at a damping interface between the damping member 20 and the load-carrying member 16. According to one embodiment, the damping interface comprises frictional contact between two surfaces. This type of damping is generally known as "coulomb damping." The FIG. 2 embodiment utilizes coulomb damping. According to another embodiment, the damping interface may comprise a constrained viscoelastic damping layer disposed between the load-carrying member 16 and the damping member 20. This embodiment will be discussed with more detail in relation to FIG. 12.

Still referring to FIG. 2, the actual load is transferred through the load-carrying member 16 rather than the damping member 20, according to an aspect of the invention. Loading of the damping member 20 consists essentially of cyclic distortion or vibration loads induced by cyclic distortion of the load-carrying member 16. The damping member is otherwise passive, meaning that the damping member 20 experiences "essentially" no loading in the absence of cyclic distortion or vibration of the load-carrying member 16. In operation, the load-carrying member 16 bears the actual load transferred between the first mass and the second mass, which may generate a cyclic distortion or vibration in the load-carrying member superposed upon the actual load. Conceptually, the actual load may be viewed as the average load transferred between the first mass 12 and second mass 14 during the load-carrying event. The damping member 20 bears essentially only cyclic loads induced by the cyclic bending mode movement or vibration of the load-carrying member 16. However, a small amount of the actual load carried between the first and second masses 12 and 14 by the load-carrying member 16 may be incidently transferred to the damping member 20 through the damping interface 20, and the term "essentially" is intended to encompass such effects.

The coulomb damping embodiment of FIG. 2 may be implemented by providing the load-carrying member 16 with an axially distributed circumferential surface 18, and by providing the damping member with a second surface 22 that engages the first surface 18. The first surface 18 and second surface may be generally coterminous. As used herein, the term "axial" refers to the lengthwise direction, as indicated at 11 in FIG. 1, and may or may not include the entire length of the referenced component. In the FIG. 2 embodiment, the damping interface comprises frictional contact between the first surface 18 and the second surface 22. The second surface 22 slides relative to the first surface 18 during cyclic distortion of the load-carrying member 16 thereby dissipating distortion energy at the damping interface between the first surface 18 and the second surface 22.

In coulomb damping, energy is dissipated as work exerted against friction forces during relative cyclic distortion between two bodies. The friction force is normally independent of displacement or rates of displacement and dependent only on the interface pressure, the coefficient of friction, and the direction of relative motion between the bodies. For analytical purposes, it is proportional to friction and interface pressure and inversely proportional to vibration amplitude and frequency. Thus, it is a nonlinear form of damping which has the characteristic that it is relatively great for relatively small distortion amplitudes and relatively small for relatively great distortion amplitudes. In this invention, there may be an additional coulomb effect independent of amplitude and proportional to the bending stiffness of the damping member 20. The friction effect is small if the interference contact pressure between the load-carrying member 16 and damping member 20 is small. The additional bending effect is small if the bending stiffness of the damping member is small. The bending effect is non-existent if the distortion does not comprise a bending mode. According to a preferred embodiment, the load-carrying member 16 receives the damping member 20 with an interference fit resulting in the second surface 22 pressing against the first surface 18. The interference pressure is preferably great enough to provide significant damping at low amplitudes, but low enough to allow relative sliding motion to occur between the two bodies in contact.

The cyclic distortion that is damped at the damping interface may comprise various forms of distortion, including torsional modes and/or bending modes. For bending in a plane parallel to the axial direction 11, the load-carrying member 16 has a load-carrying member neutral axis 28, and the damping member 20 has a damping member neutral axis 26. The load-carrying member 16 also has a load-carrying member shear center 38 for the bending mode, and the damping member 20 has a damping member shear center 36 for the bending mode. Still referring to FIG. 2, at least a component of the bending mode may occur in a reference plane 24 parallel to the axial direction 11. An additional reference plane 30 is also presented, normal to the reference plane 24. Reference plane 24 and additional reference plane 30 are interchangeable, and are intended to provide a reference frame for purposes of defining the invention without limiting the invention to the specific orientations of the reference planes presented in the figures. According to an aspect of the invention, the damping member neutral axis 26 and the load-carrying neutral axis 28 have a predetermined neutral axis misalignment 32, parallel to the reference plane 24. The neutral axis misalignment causes relative sliding movement between surfaces 18 and 22 during bending of the load-carrying member 10. This type of sliding action is referred to herein as "axial sliding" because it occurs in the axial direction.

According to another aspect of the invention, shifting the shear center of the load-carrying member 16 out of the plane of bending also causes relative sliding movement between surfaces 18 and 22 during distortion of the structural member 10. Still referring to FIG. 2, at least a component of the bending mode may occur in the reference plane 30. The damping member shear center 36 and the load-carrying member shear center 38 have a predetermined shear center misalignment 40. The shear center misalignment 40 is normal to the reference plane 30. Shifting the load-carrying member shear center 38 out of the plane of bending causes the load-carrying member to twist during bending. Likewise, shifting the damping member shear center 36 out of the plane of bending causes the damping member to twist during bending. Misaligning the two shear centers causes one member to twist more than the other member, resulting in relative sliding movement between the first surface 18 and second surface 22. Either or both shear centers 36 and 38 may be shifted out of the plane of bending as long as there is a misalignment 40. This type of sliding will be referred to herein as "rotational sliding" since it occurs in a plane generally normal to the axial direction in a rotational manner.

Note that bending in the reference plane 24 will not cause rotational sliding because the misalignment 40 of the shear centers 36 and 38 is parallel to the reference plane 24. Likewise, note that bending in the reference plane 30 will not cause axial sliding because misalignment 32 of the neutral axes 26 and 28 is normal to the to reference plane 30. Therefore, according to the example presented, neutral axis misalignment causes relative sliding movement between the first surface 18 and second surface 22 for bending in the reference plane 24, and shear center misalignment causes relative sliding movement between the first surface 18 and second surface 22 for bending in the reference plane 30. Bending in the reference plane 24 induces axial sliding, and bending in the reference plane 30 induces rotational sliding.

The predetermined neutral axis misalignment 32 and predetermined shear center misalignment 40 are established by the cross-sections of the damping member 20 and load-carrying member 16. In the FIG. 2 example, an axial slot 44 is provided that shifts both the neutral axis 26 and shear center 36 of the damping member 20 from the neutral axis 28 and shear center 38 of the load-carrying member. The cross-section of the damping member 20 depends on the cross-section of the load-carrying member 16 and the damping characteristics desired in the damped member 10. It is not intended to limit the invention to the specific cross-sections presented in the figures, since many cross-sections are evident to an artisan skilled in the art, and may be designed according to the principles provided herein. Any such variations are considered to fall within the purview the invention.

Figure 3:
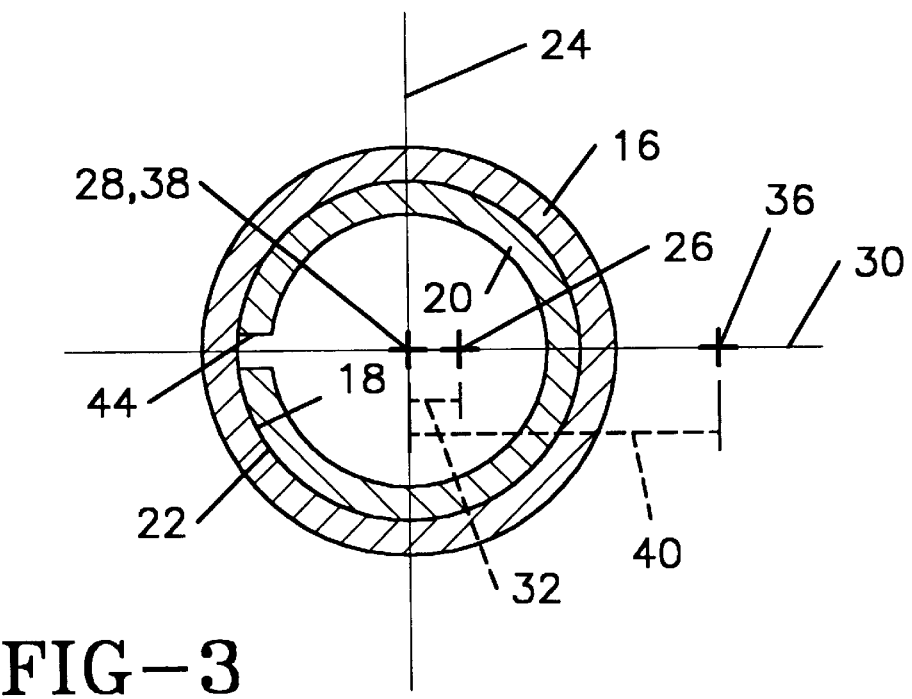
FIG. 3 is a cross-section view of a damped member according to another aspect of the invention along line A—A of FIG. 1.

Referring now to FIG. 3, a cross-section of another embodiment of the invention along line A—A of FIG. 1 is presented, wherein the damping member 20 is rotated on the order of 90° from the position presented in FIG. 2. Relative sliding motion between the first and second surfaces 18 and 22 still occurs during bending of the load-carrying member 10 in both reference planes 24 and 30, but now bending in reference plane 24 produces rotational sliding due to shear center misalignment 40 normal the reference plane 24, and bending in reference plane 30 produces axial sliding due to neutral axis misalignment 30 parallel to reference plane 30. Rotating the damping member 20 to provide axial sliding versus rotational sliding in one reference plane versus another may optimize damping in one or both planes since each type of sliding may generate a different amount of damping, depending on the cross-section of the damping member 20, and the relative magnitudes of bending distortion.

Figure 4:
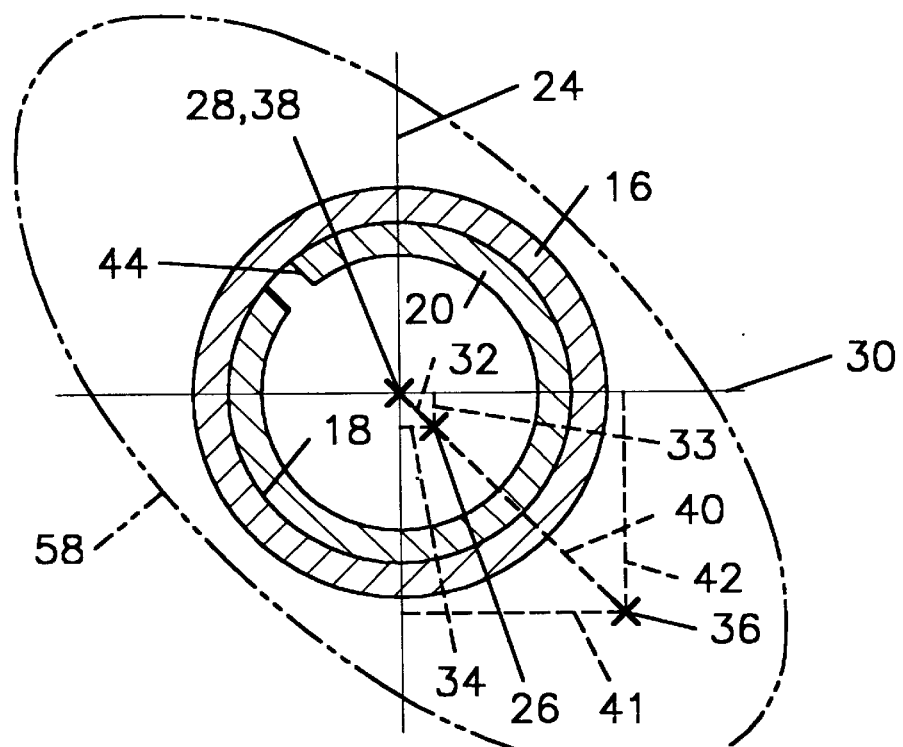
FIG. 4 is a cross-section view of a damped member according to another aspect of the invention along line A—A of FIG. 1.

Referring now to FIG. 4, a cross-section of another embodiment of the invention along line A—A of FIG. 1 is presented. In this embodiment, the damping member 20 is rotated less than 90° from the position presented in FIG. 2. This orientation causes a combination of sliding effects for bending in both the reference plane 24 and the reference plane 30. In the embodiment presented the damping member neutral axis 26 and the load-carrying neutral axis 28 have a predetermined neutral axis misalignment 32. At least a component 33 of the predetermined neutral axis misalignment 32 is parallel to the reference plane 24, which causes relative axial sliding between first surface 18 and second surface 22 during bending in said first plane. In addition, the damping member shear center 36 and the load-carrying member shear center 38 have a predetermined shear center misalignment 40. At least a component 41 of the predetermined shear center misalignment 40 is normal to the reference plane 24. The component 41 of the shear center misalignment 40 causes relative rotational sliding between first surface 18 and second surface 22 during bending in the reference plane 24. Therefore, bending in the reference plane 24 causes a combination of axial sliding and rotational sliding. The same is also true for the reference plane 30. At least a component 34 of the predetermined neutral axis misalignment 32 is parallel to the reference plane 30, which causes relative axial sliding between first surface 18 and second surface 22 during bending in reference plane 30. Likewise, at least a component 42 of the predetermined shear center misalignment 40 is normal to the additional reference plane 30, which causes relative rotational sliding between the first surface 18 and the second surface 22 during bending in reference plane 30. Therefore, bending in the reference plane 30 causes a combination of axial sliding and rotational sliding between first surface 18 and second surface 22.

The damping effects of a coulomb damper according to the invention may be quantified through experiment and/or analysis. The predetermined neutral axis misalignment may provide a predetermined quantity of bending damping in a desired reference plane. Similarly, the predetermined shear center misalignment may provide a predetermined quantity of bending damping in a desired reference plane. In addition, a predetermined neutral axis misalignment may be used with or without a predetermined shear center misalignment. Likewise, a predetermined shear center misalignment may be used with or without a predetermined neutral axis misalignment. A predetermined neutral axis misalignment and predetermined shear center misalignment may be used together to provide a predetermined quantity of bending damping in a desired reference plane. The magnitude and orientation of a neutral axis misalignment and/or shear center misalignment may be manipulated and combined to provide a predetermined quantity of damping, and relative degree of damping, in each reference plane. Referring to FIG. 4, for example, the load-carrying member 16 and damping member 20 may cyclicly follow a deflection path 58 (shown in phantom) during the cyclic distortion. The deflection path 58 represents the path a point on the load-carrying member 16 or damping member 20 may follow during the cyclic distortion, and is shown greatly exaggerated in FIG. 4 for the sake of clarity. The magnitude and orientation of the predetermined neutral axis misalignment 32 and predetermined shear center misalignment 40, along with the angular orientation of the damping member 20, may be manipulated and combined to provide a predetermined quantity of damping, and relative degree of damping, in each reference plane that optimally damps the cyclic distortion causing the deflection path 58.

Directional damping may also be provided according to an aspect of the invention. For example, a damping member and load-carrying member may be designed having coincident neutral axes, and misaligned shear centers. The shear centers together define a reference plane, and bending in a plane normal to the reference plane is damped, while bending in a plane parallel to the reference plane is not damped. The bending damping is entirely due to rotational sliding induced by the shear center misalignment.

Figure 5:
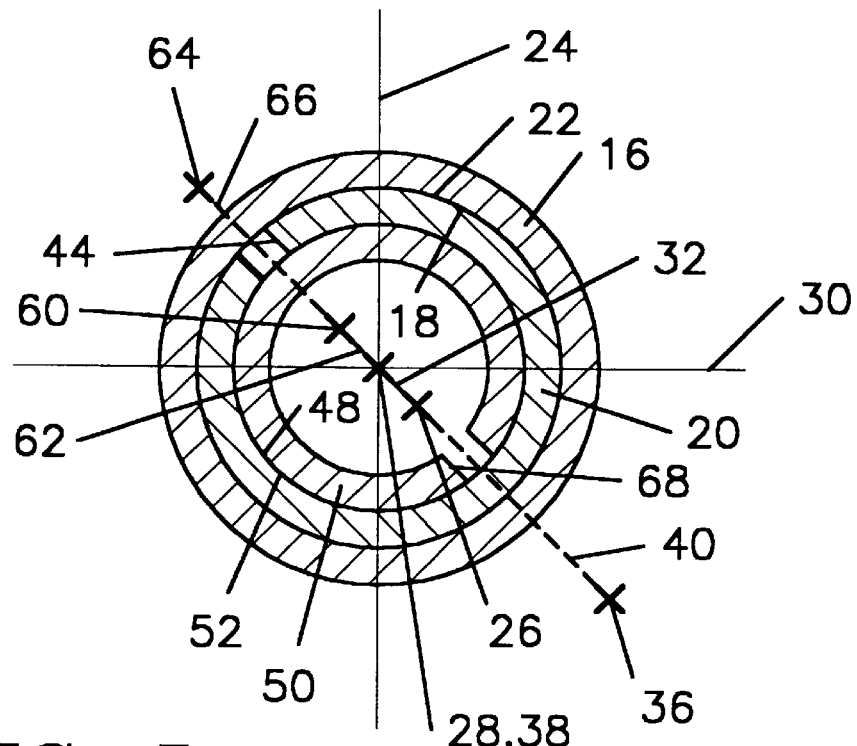
FIG. 5 is a cross-section view of a damped member according to another aspect of the invention along line A—A of FIG. 1.

Referring now to FIG. 5, another embodiment along line A—A of FIG. 1 is presented having multiple nested damping members. The damping member 20 has a third surface 48 axially distributed along the damping member 20. At least a second damping member 50 is provided having a fourth surface 52 engaging the third surface 48. The fourth surface 52 slides against the third surface 48 during bending of the load-carrying member 16 thereby providing coulomb damping. The damping member 20 may receive the second damping member 50 with an interference fit that forces the fourth surface 52 against the third surface 48, thereby enhancing the coulomb damping effect. The second damping member 50 functions the same as the damping member 20, and the principles discussed in relation to FIGS. 1–4 also apply to the damping member 50. The neutral axis 60 of the damping member 50 and the neutral axis 26 of the damping member 20 may have a predetermined neutral axis misalignment 62, which induces relative axial sliding movement between the third surface 48 and the fourth surface 52. The shear center 64 of the damping member 50 the shear center 36 of the damping member 20 may also have a predetermined shear center misalignment 66, which induces relative rotational sliding movement between the third surface 48 and the fourth surface 52. Neutral axis misalignment and shear center misalignment may be used individually or in combination to generate a predetermined amount of damping in one or more reference frames. The neutral axis misalignment 62 and shear center misalignment 66 may be established with an appropriate cross-section of the damping member 50, for example by providing an axial slot 68. As discussed previously, other cross-sections are evident to artisans skilled in the art that provide a neutral axis misalignment and/or shear center misalignment, any of which are considered to fall within the purview of the invention.

According to a preferred embodiment, the damping member 20 is oriented to provide optimized damping for bending in one plane, and the second damping member 50 is oriented to provide optimized damping for bending in a different plane. Nesting multiple damping members also greatly increases the quantity of damping without increasing overall size or weight. For example, three nested damping members having the same overall wall thickness as damping member 20 of FIG. 2 produce a far greater damping effect because coulomb damping is generated at three interfaces instead of only one interface. It is not intended to limit the invention to a specific number of nested damping members.

Figure 6:
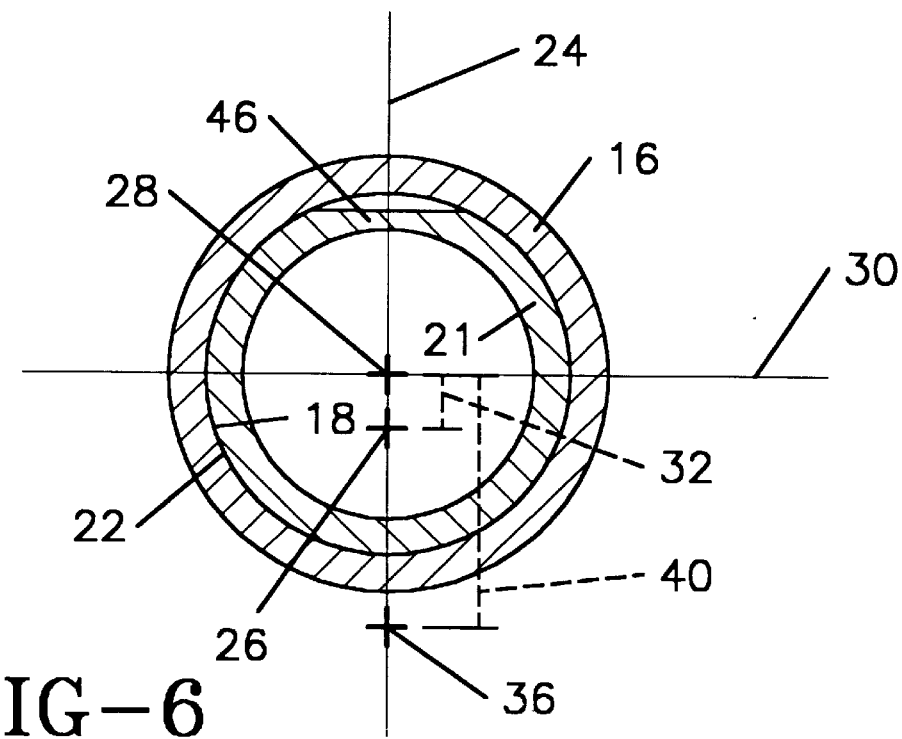
FIG. 6 is a cross-section view of a damped member according to another aspect of the invention along line A—A of FIG. 1.

Referring now to FIG. 6, a cross-section of an alternative embodiment along line A—A of FIG. 1 is presented. Damping member 21 has an axially extending reduced thickness portion 46. The reduced thickness portion 46 shifts the neutral axis 26 and the shear center 36 of the damping member 21 a desired distance, thereby generating the predetermined neutral axis misalignment 32 and predetermined shear center misalignment 40. Though shown as an axially extending flat, the reduced thickness portion 46 may have various shapes, that shift the neutral axis 26 and/or the shear center 36 to create a misalignment, any of which are considered to fall within the purview of the invention.

Figure 7:
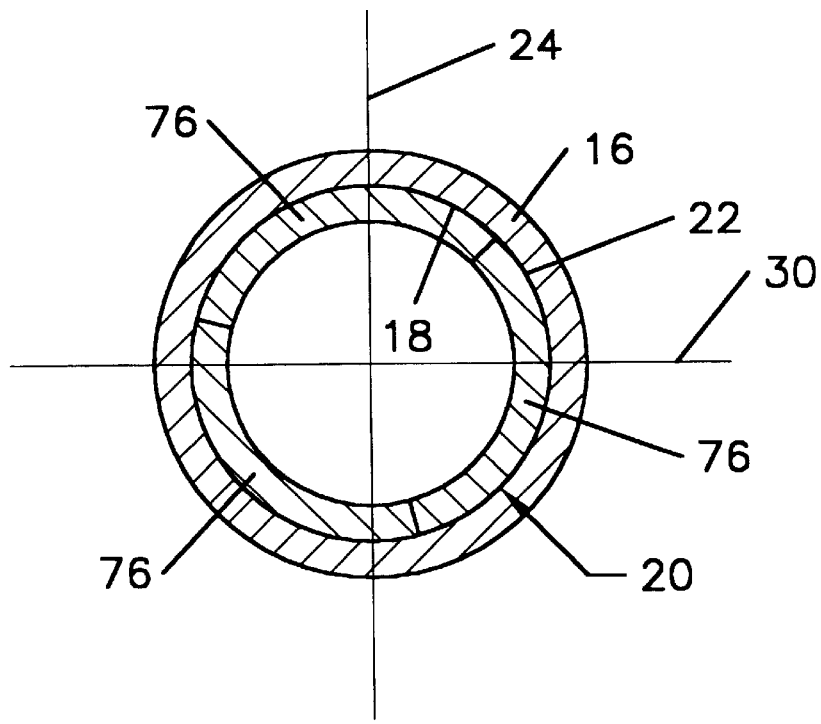
FIG. 7 is a cross-section view of a damped member according to another aspect of the invention along line A—A of FIG. 1.

Referring now to FIG. 7, a cross-section of another embodiment along line A—A of FIG. 1 is presented. In this embodiment, the damping member comprises three axially elongated shells 76 adjacent each other and nested inside the load-carrying member 16 that together form an annulus. The shells 76 move relative to the load-carrying member 16 and may move relative to each other during cyclic distortion of the load-carrying member 16. In the example presented, three identical shells are provided, each shell 76 occupying about 120° of the circumference of the damping member 20. However, it is not intended to limit the invention to a particular number of shells 76, and it is not necessary that each shell be identical or occupy the same angular space. The damping member 20 may comprise only two shells.

Figure 8:
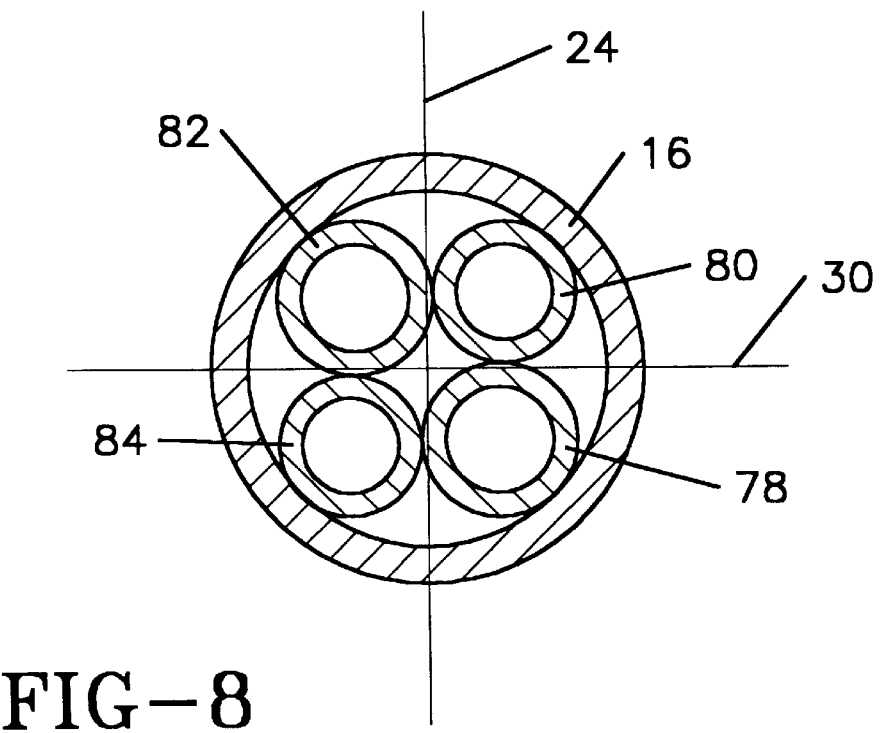
FIG. 8 is a cross-section view of a damped member according to another aspect of the invention along line A—A of FIG. 1.

Referring now to FIG. 8, a cross-section of another embodiment along line A—A of FIG. 1 is presented. In this embodiment, the damping member comprises four tubes 78, 80, 82 and 84 adjacent each other and nested inside the load-carrying member 16. The tubes 78, 80, 82 and 84 move relative to the load-carrying member 16 causing frictional interaction between surfaces 18 and 22, and may move relative to each other causing additional frictional energy dissipation effect during cyclic distortion of the load carrying member 16. In the example presented, four tubes are provided, with tubes 78 and 82 being the same size, and tubes 80 and 84 being the same size. It is not intended to limit the invention to a specific number of tubes, or to tubes having specific sizes. As few as two tubes may be utilized, and tubes having the same and/or different sizes may be utilized in the practice of the invention.

Referring now to FIG. 9, a damping member 20 according to an alternative embodiment is presented. Damping member 20 is provided with at least one hole 86 through the wall of the damping member 20. FIG. 10 presents a cross-section of the damped structural member 10 along line A—A of FIG. 1 that utilizes the damping member 20 of FIG. 9. The holes may be arranged to shift the neutral axis and/or shear center of the damping member 20 as previously described in order to induce relative sliding motion between the damping member 20 and the load carrying member 16. Different numbers of holes may be provided, and the holes may have the same or different sizes. The holes may be arranged in one or more rows, and the rows may be staggered relative each other. The holes may be arranged in other ways, such as a helical pattern, and the holes need not be circular. The holes may also be arranged such that the position of the neutral axis and/or shear center changes with axial position along the axis of the damping member 20, and this effect may be employed via other geometric configurations, such as a helical damping member similar to a helical spring.

Referring now to FIG. 11, a cross-section of another embodiment along line A—A of FIG. 1 is presented. In this embodiment, the damping member 20 comprises a first tube-like member 88 and second tube-like member 92 concentrically disposed inside the first tube-like member 88. A constrained viscoelastic layer 90 is disposed between and bonded to the first tube-like member and the second tube-like member 92. This embodiment is actually a hybrid between coulomb damping and viscoelastic damping. During cyclic bending of the load-carrying member 16, surface 18 slides relative to surface 22, which provides coulomb damping. In addition, the viscoelastic layer is flexed during cyclic bending of the load-carrying member 16, which adds viscoelastic damping to the system. This embodiment may or may not use neutral axis misalignment and/or shear center misalignment since viscoelastic damping relies on distortion of the viscoelastic layer 90 to dissipate vibration energy. This occurs even without neutral axis misalignment and/or shear center misalignment. However, neutral axis misalignment and/or shear center misalignment may be employed to increase distortion of the viscoelastic layer, and a slot 94 may be provided for this purpose. As previously described, other cross-sectional shapes may be employed to utilize neutral axis misalignment and/or shear center misalignment, and any such variations are considered to fall within the purview of the invention.

Figure 12:
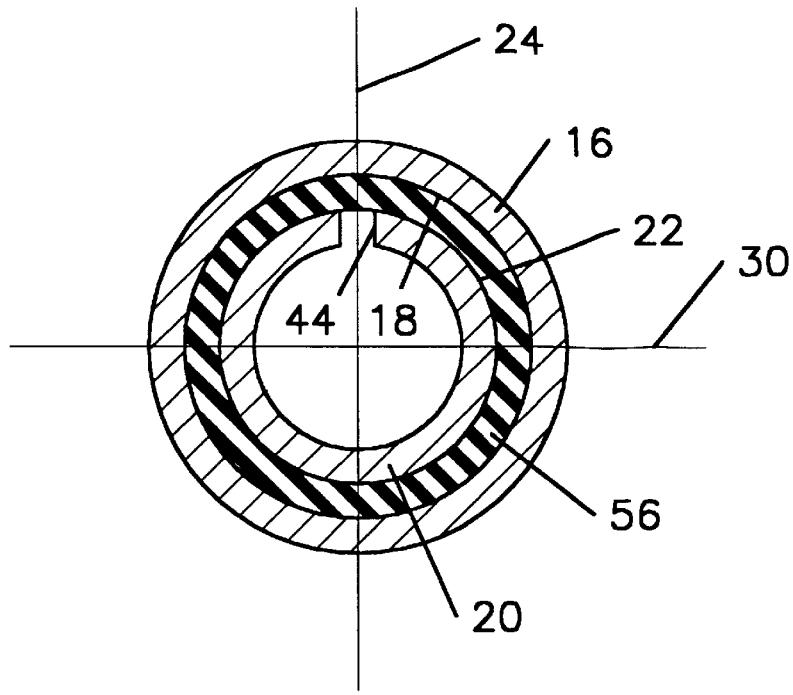
FIG. 12 is a cross-section view of a damped member according to another aspect of the invention along line A—A of FIG. 1.

Referring now to FIG. 12, a cross-section of another alternative embodiment along line A—A of FIG. 1 is presented. In this embodiment the damping interface comprises a constrained viscoelastic damping layer 56 disposed between and bonded to the first surface 18 and the second surface 22. Viscoelastic damping is a different damping mechanism than coulomb damping, and relies on distortion of the viscoelastic layer 56 rather than frictional interaction between surfaces 18 and 22. The viscoelastic layer 56 is distorted by relative movement between the load-carrying member 16 and damping member 20. The relative movement may be generated according to any method disclosed herein. Increased relative movement between the load-carrying member 16 and damping member 20 through neutral axis misalignment and/or shear center misalignment generates a greater distortion of the viscoelastic layer 56 in comparison to known viscoelastic damping devices, resulting in greater damping with equivalent (or less) size and weight. Neutral axis misalignment and shear center misalignment are particularly preferred for damping bending in a plane parallel to the axis of the load-carrying member 16.

Figure 13:
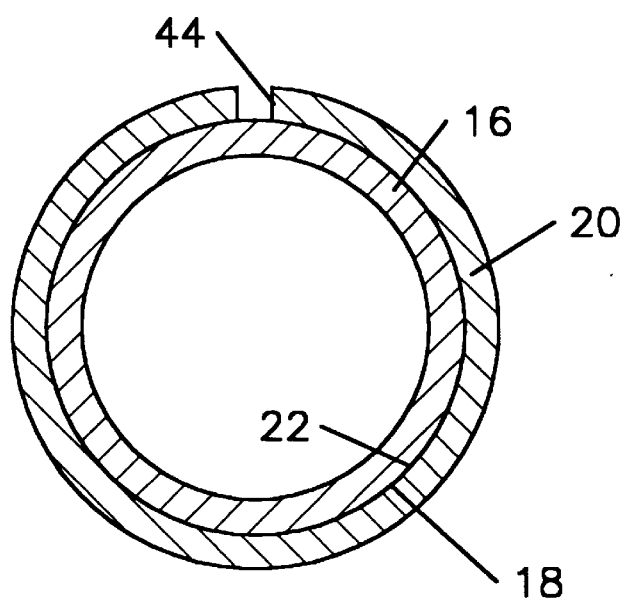
FIG. 13 is a cross-section view of a damped member according to another aspect of the invention along line A—A of FIG. 1.

According to a preferred embodiment, wherein the load-carrying member has an elongated axial cavity 54, as shown in FIG. 1, with the tube-like sleeve being received within the elongated axial cavity 54. However, outside mounting of the damping member is also envisioned. Referring to FIG. 13, for example, a cross-section along line A—A of FIG. 1 is provided wherein the damping member 20 is provided on the outside, rather than the inside, of the load-carrying member 16. Any of the configurations presented in FIGS. 2–12 may be attached to an outer surface of the load-carrying member in such manner, but an additional structure is required for the FIG. 7 and 8 embodiments in order to hold the damping member 20 in contact with the load-carrying member 16. According to a preferred embodiment, the load-carrying member receives the damping member with an interference fit, whether the damping member is attached inside or outside the load-carrying member.

In FIGS. 2–13, the load-carrying member 16 is cylindrical, with a cylindrical axial cavity 54 as shown in FIG. 1. In such case, the damping member 20 may be configured as a tube-like sleeve concentric with the load-carrying member. This arrangement is particularly simple and cost effective. However, the invention is also useful with non-cylindrical load-carrying members having symmetric cross-sections or asymmetric cross-sections. In addition, the invention is useful with non-constant cross-sections in the axial direction, and axially tapered cross-sections and surfaces. Any such variations are considered to fall within the purview of the invention.

The axial slot 44 of FIGS. 2–5 and 7–8 is shown having a width. Varying the width of the axial slot changes the position of the neutral axis 26, and may thereby vary the quantity of coulomb damping generated by the damping member. Replacing the slot 44 with an axial slit of non-existent or negligible width does not change the position of the neutral axis relative to a damping member without an axial slit. However, an axial slit of non-existent or negligible width does cause the shear center to shift to a position about two times the diameter diametrically opposite the axial slit. A damping member configured in this manner may be utilized to generate entirely rotational sliding during bending distortion. For example, with a cylindrical damping member 20 having an axial slit of negligible width and a cylindrical load-carrying member 16, the neutral axes are aligned at the axis of revolution of the cylindrical members, and the shear centers are separated by a distance of about two times the mean diameter of the damping member 20. In this example, rotational sliding is generated during bending unless the shear center lays in the plane of bending. This effect may be useful for damping some bending modes.

Figure 14:
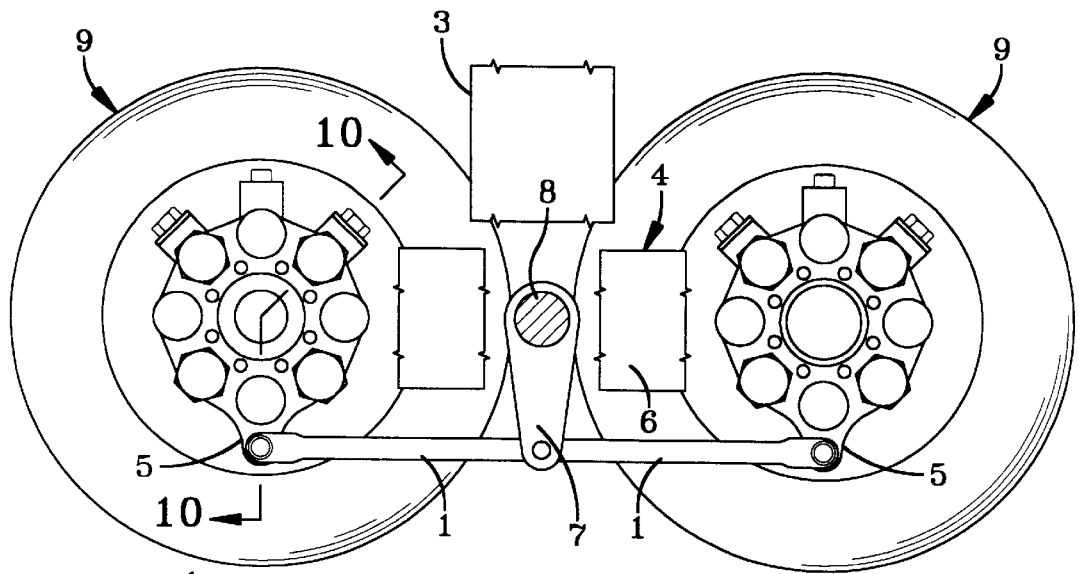
FIG. 14 is a schematic view of typical prior art landing gear assembly.

The invention is particularly useful for damping various components in a landing gear and/or wheel and brake assembly. A general description of a typical prior art landing gear and wheel and brake assembly follows as a general background to facilitate describing further embodiments of the invention. Referring now to FIG. 14, a typical prior art aircraft landing gear 2 includes a strut 3 and a multi-wheel truck 4 pivotally connected to the strut, and one or more brake rods 1. The beam 6 of the truck carries at opposite ends thereof respective axles for a plurality of wheel and brake assemblies 9. One end of each brake rod 1 is pivotally connected to a respective one of the wheel and brake assemblies at a torque arm lug 5 while the other end is pivotally connected to an attachment lug 7 at the lower end of the strut 3. The pivot connection may be below the truck's pivot pin 8 as shown, or otherwise such as above the pivot pin 8 while still achieving the same functionality.

Figure 15:
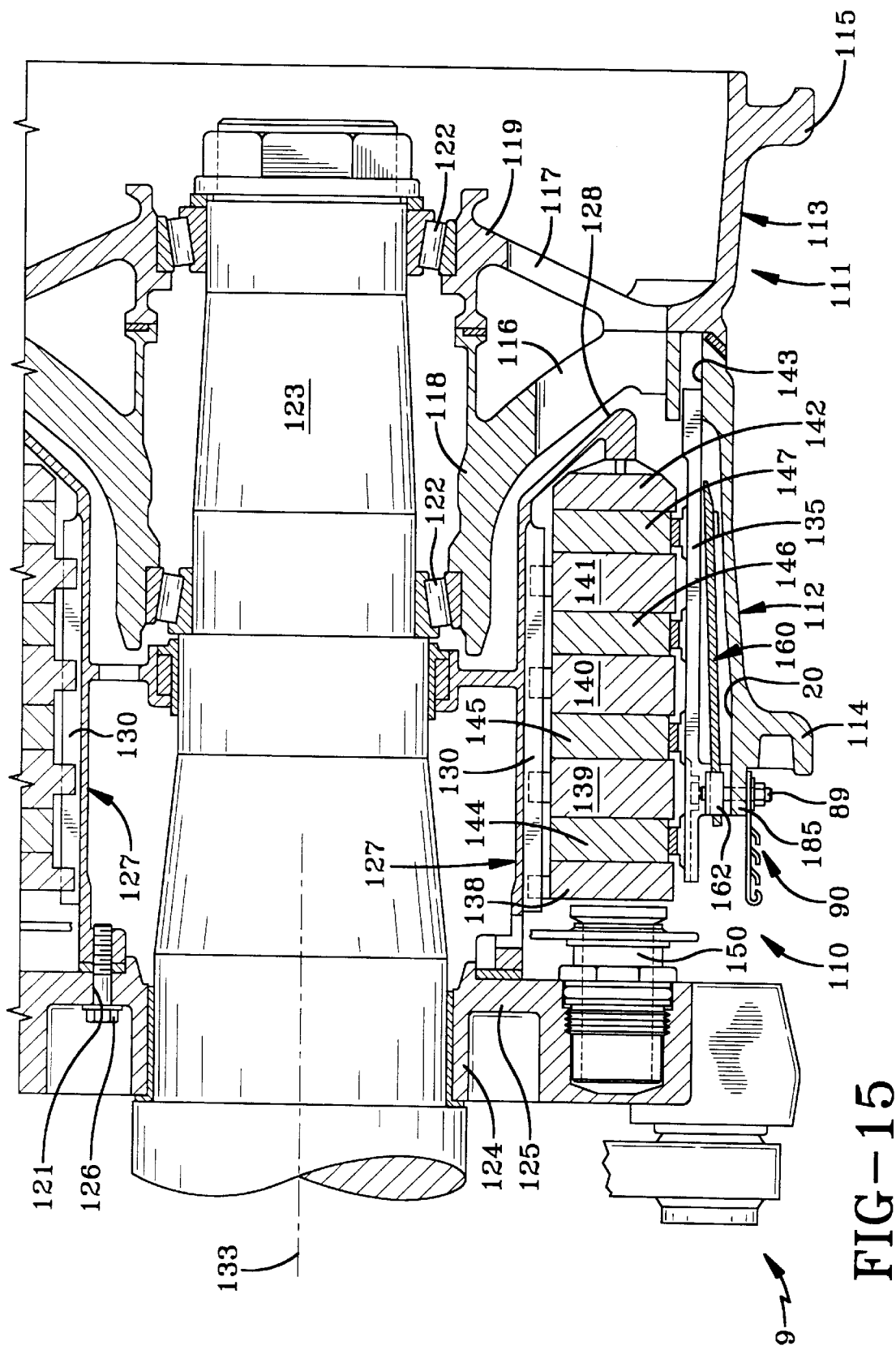
FIG. 15 is a sectional view of a typical prior art wheel and brake assembly.

Referring now to FIG. 15, a detailed sectional view of a typical prior art wheel and brake assembly 9 along line 10—10 of FIG. 14 is presented, comprising a friction brake mechanism 110 and a cylindrical wheel 111. The tire is not shown in FIG. 15 for the sake of clarity. The wheel 111 has matching inboard wheel section 112 and outboard wheel section 113. Each of the wheel sections 112, 113 has a corresponding respective rim member 114, 115, web member 116, 117, and hub member 118, 119. The wheel sections 112 and 113 are fastened together by suitable bolts (not illustrated) disposed in aligned bores (not illustrated) within web members 116 and 117 to form an integral unit. Friction brake mechanism 110 is generally symmetrical about its central axis of rotation 133.

The hub members 118 and 119 are rotatably supported by bearings 122 mounted on a nonrotatable axle member 123. A stationary carrier or boss 124 provided with a circumferentially-extending flange 125 is suitably mounted on stationary axle 123. Flange 125 has a plurality of circumferentially spaced bores 121 to receive bolts 126 for securing such flange to one end of a cylindrical torque tube 127. The other (outboard) end of torque tube 127 has an annular and radially outwardly extending reaction member 128. The reaction member 128 may be made integrally with the torque tube 127 as illustrated in FIG. 1 or may be made as a separate annular piece and suitably connected to the torque tube 127.

Torque tube 127 has on its exterior a plurality of circumferentially spaced, axially extending splines 130. Inboard wheel section 112 has a plurality of circumferentially spaced torque-transmitting bars 135 each connected to the rim flange portion 185 of wheel section 112 at their inboard ends by respective spacer means 162 and at their outboard ends to the radially outward portion of web member 116 by seating in respective annular recesses in such web member. The torque bars 135 may be varied in design from those shown and secured to the wheel section 112 by other suitable means such as is described in U.S. Pat. No. 5,024,297 to Russell to provide an integral connection therebetween.

Splines 130 support an axially non-rotatable piston end disc or stator disc 138 and inner discs 139, 140 and 141. All of such non-rotatable discs 138, 139, 140 and 141 have slotted openings at circumferentially spaced locations on their respective inner peripheries for captive engagement by the splines 130, as is old and well-known in the art. A non-rotatable annular disc or annular braking element 142 is suitably connected to the torque plate or reaction member 128 and acts in concert with the stator discs 138, 139, 140 and 141 which discs (138, 139, 140, 141 and 142) constitute the stators for the friction brake 110. A suitable manner of connection of disc 142 to reaction member 128 is described in U.S. Pat. No. 4,878,563 to Baden et al.

Each of a plurality of axially-spaced discs (rotor discs) 144, 145, 146 and 147 interleaved between the stator discs 138 through 142, has a plurality of circumferentially spaced openings along its respective outer periphery for engagement by the corresponding wheel torque bar 135, as is old and well known in the art, thereby forming the rotor discs for the friction brake 110. All of the non-rotatable discs (138, 139, 140, 141 and 142) and rotatable discs (144, 145, 146 and 147) may be made from a suitable brake material such as steel or other metal or other wear-resistant material such as carbon for withstanding high temperatures and providing a heat sink. The number and size of discs may be varied as necessary for the application involved. Those stator discs and rotor discs that have circumferentially spaced openings on their respective inner and outer peripheries may accommodate reinforcing inserts to provide reinforcement to the walls of such slotted openings and to enhance the life of such slots, as is old and well-known in the art.

The actuating mechanism or power means for the brake includes a plurality of circumferentially spaced cylinders 150 suitably mounted on or connected to the flange 125. Within each of the cylinders 150 is a hydraulic piston or electromechanical actuators, which is operative to move the stator discs 138 through 141 axially into and out of engagement with their respective associated rotatable discs 144 through 147, which in turn causes the facing radial surfaces of all of the brake discs to frictionally engage their radial surfaces as they are forced toward but are resisted by the end stationary annular disc 142 and the reaction member 128 on torque tube 127. During this period of brake disc engagement, the friction forces among all the rotatable and non-rotatable discs generate considerable heat energy within the discs. It is the frictional engagement of these stator and rotor discs which produces the braking action for the aircraft wheel.

An interior wheel heat shield 160 is cylindrically shaped and is located between the inner surface 120 of wheel section 112 and the torque-transmitting bars 135. Interior wheel heat shield 160 may be formed as a single cylindrical piece or by joining together a plurality of arcuate pieces. The interior wheel heat shield may be formed by laminating a layer of ceramic fibrous material between two layers of stainless steel in a manner well known in the art. As described above, each torque bar 135 at its outboard (wheel web) end is connected to the web member 116 by seating in an annular recess 143. The inboard (piston) end of each torque bar 135 and the adjacent portion of the heat shield 160 is secured to inboard rim member 114 of inboard wheel section 112 by a spacer 162. Spacer 162 is a rectangular shaped member that is recessed on its upper and lower surfaces to present an upper flat surface with a pair of spaced abutments or shoulders that receive the sides of torque bar 135 and present a lower surface with a lower pair of abutments or shoulders. With the interior wheel heat shield 160 firmly in place, the protective heat shield 190 effectively protects the wheel and its supporting structure from the transfer of heat energy from the heat sink.

Figure 16:
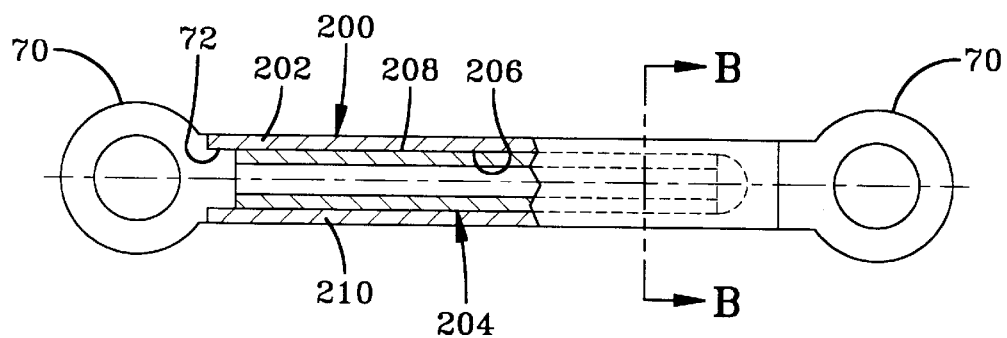
FIG. 16 is a side view of a damped brake rod according to an aspect of the invention, with parts broken away.
Figure 17:
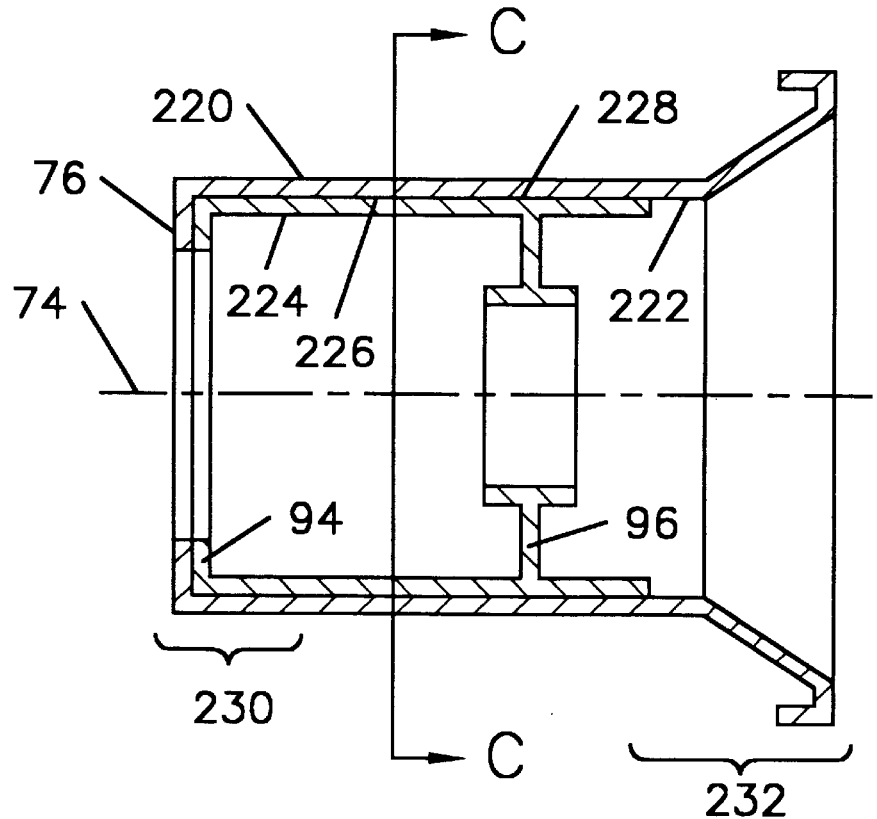
FIG. 17 is a sectional view of a damped torque tube according to an aspect of the invention.
Figure 18:
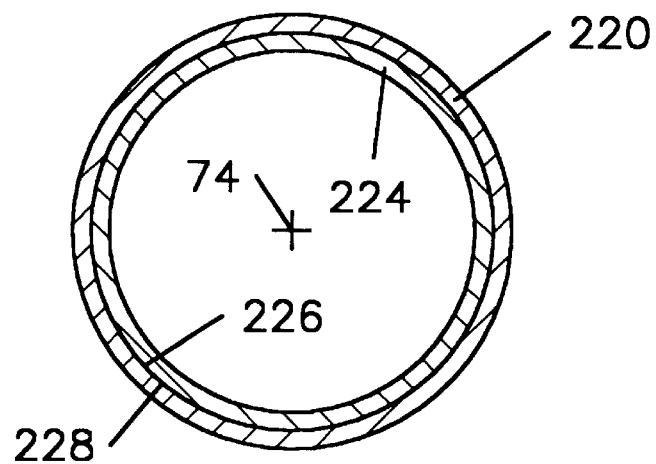
FIG. 18 is a cross-sectional view of the FIG. 17 torque tube along line C—C of FIG. 17.

With this background, examples of further embodiments of the invention are presented in FIGS. 16–18. Referring now specifically to FIG. 16, a damped brake rod 200 according to an aspect of the invention is presented for attachment to a structure, the structure having at least one wheel and brake assembly. The structure may take various forms such as a high speed locomotive, or an aircraft landing gear, to the extent that relative rotation between the structure and the wheel and brake assembly is prevented by a brake rod or a similar structure regardless of the specific terminology employed. In the example presented, the structure is an aircraft landing gear 2, as presented in FIG. 14, but it is not intended to limit the invention to an aircraft landing gear.

During braking, some brakes develop an unacceptable level of vibration which may result in passenger discomfort, and/or damage to components of the landing gear 2 or wheel and brake assembly 9. Presently, the source of brake vibration is generally regarded to lie in the nature of friction itself, and its sensitivity to various conditions of its operating environment, such as load, speed, temperature, and surface irregularity. The vibration may originate due to a dynamically unstable state at the time braking which results in an unacceptable level of kinetic energy from the motion of the aircraft feeding into vibration modes in one or more components of the landing gear 2 and/or wheel and brake assembly 9 rather than being dissipated as heat energy in the heat sink (disks 138–142 and 144–147 of FIG. 15). Regardless of the cause of the vibration, it was discovered that bending mode vibration of the brake rod 1 was often the greatest vibration level in some aircraft. In addition, it was discovered that coulomb damping is particularly effective in damping bending mode vibration in a brake rod induced during braking. Finally, it was also discovered that the wheel and brake assembly 9 and the landing gear 2 behave as a dynamic system, and that damping the brake rod decreases the overall amount of kinetic energy feeding vibration modes in the landing gear 2 and/or wheel and brake assembly 9. Thus, the significance of at least one source of the problem, bending mode vibration of the prior art brake rod 1, eluded prior workers in the art, and identifying this significance is an aspect of the invention.

Referring again to FIG. 16, a sectional view of a damped brake rod 200 is presented, that solves the brake and brake rod vibration problem, and which may be substituted for the prior art undamped brake rod 1 of FIG. 14 as original or replacement equipment. Damped brake rod 200 comprises a rod-like member 202 for attachment to the brake assembly 9 and the structure 2 to resist rotation of the brake assembly 9 relative to the structure 2. The rod-like member may be provided with forked knuckles 70 (only one fork shown) that are pinned to the torque arm lug 5 and attachment lug 7 (FIG. 14). A bending mode coulomb damper 204 is attached to the brake rod that damps cyclic bending mode movement of the rod-like member 202 during braking. The rod-like member 202 may be formed as a single piece, or as an assembly of at least two pieces. The rod-like member 202 preferably behaves as a continuous beam in dynamic bending. Therefore, the rod-like member 202 is preferably formed from a single piece of material, but two or more pieces may be assembled with joints that are suitably rigid in bending, and the rod-like member as whole will behave as a continuous beam in dynamic bending.

According to a preferred embodiment, the rod-like member 202 has a first surface 206 axially distributed along the rod-like member 202, and the bending mode damper 204 comprises at least one elongated member 210 having a second surface 208 engaging the first surface 206. The elongated member 210 generates coulomb damping by means of the second surface 208 sliding against the first surface 206 during bending of the rod-like member 202, as previously described in relation to FIGS. 1–4. The elongated member 210 is functionally equivalent to the damping member 20, the rod-like member 202 is functionally equivalent to the load-carrying member 16, the wheel and brake assembly 9 (FIG. 14) is functionally equivalent to one of the masses 12 or 14, and the attachment lug 7 and strut 3 (FIG. 14) are functionally equivalent to the other of the masses 12 or 14. Therefore, the rod-like member 202 and elongated member 210 may be configured according to any of the embodiments presented in FIGS. 2–11, thereby utilizing a predetermined neutral axis misalignment and/or predetermined shear center misalignment according to the teachings of those embodiments. Any of the embodiments of FIGS. 2–11 are representative of the view along line B—B of FIG. 16. One or more elongated members may be nested, as presented in FIG. 5, and the elongated members may disposed inside the rod-like member, as presented in FIGS. 2–11, or outside the rod-like member, as presented in FIG. 13. All of the teachings provided in relation to those figures are applicable to the damped brake rod 200 of FIG. 16. In some brake rods, the cyclic bending occurs predominantly in a vertical plane, and the bending mode damper is preferably oriented to optimize damping in that plane. The damped brake rod 200 may also have a constrained viscoelastic damping layer configured according to FIG. 12. However, coulomb damping is believed to more effective in damping the brake rod vibration induced in a landing gear and wheel and brake assembly system. In addition, it is not intended to limit the damped brake rod according to the invention to the specific bending mode coulomb dampers presented in FIGS. 2–11 and 13, as other forms of bending mode coulomb dampers may provide effective damping. The bending mode coulomb dampers disclosed herein are particularly effective, lightweight, simple, and inexpensive.

Many brake rods have an internal or external cylindrical portion of substantial length between the knuckles 70 that defines the first surface 206. With such brake rods, the bending mode damper 204 preferably comprises at least one tube-like sleeve 210 having a second surface 208 engaging the first surface 206, and wherein the second surface 208 slides against the first surface 206 during bending of the rod-like member 202 thereby providing coulomb damping. Many brake rods have an elongated axial cavity 72 cylindrical in cross-section as a matter of brake rod design. The invention is particularly useful with this type of brake rod because the tube-like sleeve 210 fits conveniently and compactly inside the elongated axial cavity 72, without adding a significant amount of weight to the brake rod 200. The tube-like sleeve 210 preferably comprises a cylindrical tube having an axial slot (as shown in FIG. 2), and is preferably configured such that the rod-like member 202 receives the tube-like sleeve 210 with an interference fit that forces the second surface 208 against the first surface 206. Two or more cylindrical tubes may be nested to maximize damping in a compact space.

According to one embodiment, a stock Boeing 747-400 brake rod having an internal sandblasted axial bore of about 2.25 inches in diameter was provided with a single tube-like sleeve about 14.5 inches long, having an axial slot about 0.070 to 0.130 inches wide, an inside diameter of about 2 inches, and an outside diameter of about 2.255 inches resulting in about a 0.005 inch interference between the sleeve and the bore. The sleeve was formed from 4340 steel, weighed about 3.4 pounds, and protruded about 1¼ inches from the brake rod bore. The damped brake rod according to this embodiment greatly reduced brake induced vibration during braking, and brought the vibration well within acceptable levels.

Referring now to FIG. 17, a sectional view of a brake torque tube 220 is presented, that may also reduce or eliminate some forms of brake vibration, and which may be substituted for the prior art undamped torque tube 127 of FIG. 15 as original or replacement equipment. In this embodiment, the damping interface preferably comprises frictional contact between a first surface 226 and a second surface 228 because of the heat generated in the brake disks 138–142 and 144–147 (FIG. 15) during braking. The brake torque tube 220 comprises a generally cylindrical cavity 222, and the damping member preferably comprises a cylindrical sleeve 224 engaging the cylindrical cavity 222. The brake torque tube has a first surface 226, and the damping member or cylindrical sleeve 224 has a second surface 228. The damping interface comprises frictional contact between the first surface 226 and the second surface 228.

Several modes of vibration may be induced in the torque tube 220 during braking. Such vibrations may include cyclic torsional distortions about the axis of rotation 74 of the torque tube 220 and/or cyclic bending distortions in an axial plane. With bending modes, neutral axis misalignment and/or shear center misalignment may be utilized, as previously described in relation to FIGS. 2–4, and FIGS. 2–6 are representative of the cross-sectional views of various embodiments along line C—C of FIG. 17, wherein the brake torque tube 220 is functionally equivalent to the load-carrying member 16, and the cylindrical sleeve 224 is functionally equivalent to the damping member 20. With pure torsional modes, the cylindrical sleeve 224 may be circumferentially continuous with a circumferentially uniform wall thickness, as shown in FIG. 18. Relative sliding between surfaces 226 and 228 is due to the fact that most or all of the torsional deflection occurs in the torque tube 220 rather than the cylindrical sleeve 224, and generates the desired sliding action. Neutral axis misalignment and shear center misalignment provide no advantage with purely torsional modes of vibration. However, bending and torsional modes may occur together, and in such case, the cylindrical sleeve 224 may be configured according to the teachings provided in relation to FIGS. 2–10.

Referring again to FIG. 17, the cylindrical sleeve 224 may be permitted to float within the torque tube 220, or it may be attached in some manner to the torque tube 220. For example, the cylindrical sleeve 224 and the brake torque tube 220 define a first end 230 axially spaced from a second end 232. The cylindrical sleeve 224 and the brake torque tube 220 may be engaged together against rotation at only one of the first and second ends 230 and 232. The cylindrical sleeve 224 and torque tube 220 may be attached by bolts, or an equivalent means, at the torque tube mounting flange 76 where the torque tube 220 attaches to the stationary carrier or boss 124 (FIG. 15). If the cylindrical sleeve 224 floats, sliding is induced by the inertia of the cylindrical sleeve 224. In either case, the brake torque tube 220, rather than the cylindrical sleeve 224, transfers the braking load to the landing gear.

In the example presented in FIG. 17, the cylindrical sleeve 224 is provided with a bottom flange 94 that may be utilized to mount the cylindrical sleeve 224 to the torque tube 220 at first end 230, as previously described. Bottom flange 94 is optional since the cylindrical sleeve 224 may be mounted to the torque tube 220 in other ways, and is preferably eliminated if the cylindrical sleeve 224 is permitted to float within the torque tube 220 (the "inertial" embodiment). In addition, the cylindrical sleeve 224 is shown provided with a support flange 96. The support flange 96 engages the axle 123 (FIG. 15) and provides additional support for the wheel and brake assembly. The support flange 96 transmits axle bending distortions to the cylindrical sleeve 224 and torque tube 220, and may contribute to bending mode damping generated by the cylindrical sleeve 224. However, not all wheel and brake assemblies utilize a support flange, in such case, flange 96 may be eliminated.

It is evident that many variations of the invention are apparent to persons skilled in the art, any of which are considered to fall within the purview of the invention according to the true scope and spirit of the invention as defined by the claims the follow.

I claim:

1. A damped brake rod for attachment to a structure, the structure having at least one wheel and brake assembly, comprising:

rod-like member means for attachment to the brake assembly and the structure and for bearing a load that resists rotation of the brake assembly relative to the structure; and, bending mode coulomb damper means attached to the rod-like member means for damping cyclic bending mode movement of said rod-like member means during braking, and for bearing essentially only cyclic loads induced by cyclic bending mode movement of said rod-like member means generated during braking.

2. A damped brake rod for attachment to a structure, the structure having at least one wheel and brake assembly, comprising:

a rod-like member for attachment to the brake assembly and the structure to bear a load that resists rotation of the brake assembly relative to the structure; and, a bending mode coulomb damper attached to said rod-like member that damps cyclic bending mode movement of said rod-like member during braking, said bending mode coulomb damper bearing essentially only cyclic loads induced by cyclic bending mode movement of said rod-like member generated during braking.

3. The damped brake rod of claim 2, wherein said rod-like member acts as a single continuous beam during dynamic bending.

4. The damped brake rod of claim 2, wherein:

said rod-like member has a first surface axially distributed along said rod-like member; and, said bending mode damper comprises at least one elongated member having a second surface engaging said first surface, and wherein said second surface slides against said first surface during bending of said rod-like member.

5. The damped brake rod of claim 4, wherein said rod-like member has a rod-like member neutral axis for said bending mode, and said elongated member has an elongated member neutral axis for said bending mode; and, at least a component of the bending mode occurring in a reference plane, said elongated member neutral axis and said rod-like member neutral axis having a predetermined neutral axis misalignment, with at least a component of said predetermined neutral axis misalignment being parallel to the reference plane.

6. The damped brake rod of claim 5, wherein said predetermined neutral axis misalignment changes with axial position along the axis of said elongated member.

7. The damped brake rod of claim 5, wherein at least a component of the bending mode occurs in an additional reference plane normal to the reference plane, at least a component of said predetermined neutral axis misalignment being parallel to the additional reference plane.

8. The damped brake rod of claim 4, wherein said rod-like member has a rod-like member shear center for said bending mode, and said elongated member has a elongated member shear center for said bending mode; and, at least a component of said bending mode occurring in a reference plane, said elongated member shear center and said rod-like member shear center having a predetermined shear center misalignment, at least a component of said predetermined shear center misalignment being normal to the reference plane.

9. The damped brake rod of claim 8, wherein said predetermined shear center misalignment changes with axial position along the axis of said elongated member.

10. The damped brake rod of claim 8, wherein at least a component of said bending mode occurs in an additional reference plane normal to the reference plane, at least a component of said predetermined shear center misalignment being normal to the additional reference plane.

11. The damped brake rod of claim 4, wherein said rod-like member has a rod-like member neutral axis for said bending mode, and said elongated member has a elongated member neutral axis for said bending mode;

said rod-like member has a rod-like member shear center for said bending mode, and said elongated member has a elongated member shear center for said bending mode;

at least a component of the bending mode occurring in a reference plane, said elongated member neutral axis and said rod-like member neutral axis having a predetermined neutral axis misalignment, with at least a component of said predetermined neutral axis misalignment being parallel to the reference plane; and, said elongated member shear center and said rod-like member shear center having a predetermined shear center misalignment, at least a component said predetermined shear center misalignment being normal to the reference plane.

12. The damped brake rod of claim 11, wherein said predetermined neutral axis misalignment and said predetermined shear center misalignment change with axial position along the axis of said elongated member.

13. The damped brake rod of claim 11, wherein at least a component of the bending mode occurs in an additional reference plane normal to the reference plane, at least a component of said predetermined neutral axis misalignment being parallel to the additional reference plane; and, said elongated member shear center and said rod-like member shear center having a predetermined shear center misalignment, at least a component of said predetermined shear center misalignment being normal to the additional reference plane.

14. The damped brake rod of claim 4, wherein said rod-like member receives said elongated member with an interference fit resulting in said second surface pressing against said first surface.

15. The damped brake rod of claim 2, wherein said bending mode damper comprises a plurality of tubes received within said rod-like member, said plurality of tubes being adjacent each other and sliding against said rod-like member during cyclic distortion of said rod-like member.

16. The damped brake rod of claim 2, wherein:

said rod-like member has a first surface axially distributed along said rod-like member; and, said bending mode damper comprises at least one tube-like sleeve having a second surface engaging said first surface, and wherein said second surface slides against said first surface during bending of said rod-like member thereby providing coulomb damping.

17. The damped brake rod of claim 16, wherein said tube-like sleeve comprises a cylindrical tube having an axial slot or an axial slit.

18. The damped brake rod of claim 16, wherein said tube-like sleeve comprises a cylindrical tube having an axially extending reduced thickness portion.

19. The damped brake rod of claim 16, wherein said tube-like sleeve comprises at least two adjacent elongated shells that together form said tube-like sleeve.

20. The damped brake rod of claim 16, wherein said tube-like-sleeve has a wall and comprises at least one hole through said wall.

21. The damped brake rod of claim 16, wherein said tube-like sleeve has a third surface axially distributed along said tube-like sleeve, and said bending mode damper further comprises at least a second tube-like sleeve having a fourth surface engaging said third surface, and wherein said fourth surface slides against said third surface during bending of said rod-like member thereby providing coulomb damping.

22. The damped brake rod of claim 21, wherein said tube-like sleeve is oriented to provide damping for bending in one plane, and said second tube-like sleeve is oriented to provide damping for bending in a different plane.

23. The damped brake rod of claim 16, wherein said bending mode damper further comprises an additional tube-like sleeve nested with said tube-like sleeve, and a viscoelastic layer disposed between and bonded to said tube-like sleeve and said additional tube-like sleeve.

24. The damped brake rod of claim 16, wherein said rod-like member receives said tube-like sleeve with an interference fit that forces said second surface against said first surface.

25. The damped brake rod of claim 16, wherein said rod-like member has an elongated axial cavity, said tube-like sleeve being received within said elongated axial cavity with an interference fit that forces said second surface against said first surface.

26. A method for inhibiting vibration in a wheel and brake assembly attached to a structure, comprising the steps of:

resisting rotation of said brake assembly relative to said structure with a rod-like member attached to said brake assembly and said structure, said rod-like member bearing a braking load during braking of said structure;

damping cyclic bending mode movement of said rod-like member during braking with a bending mode coulomb damper attached to said brake rod, said bending mode coulomb damper bearing essentially only cyclic loads induced by cyclic bending mode movement of said rod-like member generated during braking.

27. The method of claim 26, wherein:

said rod-like member has a first surface axially distributed along said rod-like member; and, said bending mode damper comprises at least one elongated member having a second surface engaging said first surface, and wherein said second surface slides against said first surface during bending of said rod-like member.

28. The method of claim 27, wherein said rod-like member has a rod-like member neutral axis for said bending mode, and said elongated member has a elongated member neutral axis for said bending mode; and, at least a component of the bending mode occurring in a reference plane, said elongated member neutral axis and said rod-like member neutral axis having a predetermined neutral axis misalignment, with at least a component of said predetermined neutral axis misalignment being parallel to the reference plane.

29. The method of claim 28, wherein said predetermined neutral axis misalignment changes with axial position along the axis of said elongated member.

30. The method of claim 28, wherein at least a component of the bending mode occurs in an additional reference plane normal to the reference plane, at least a component of said predetermined neutral axis misalignment being parallel to the additional reference plane.

31. The method of claim 27, wherein said rod-like member has a rod-like member shear center for said bending mode, and said elongated member has a elongated member shear center for said bending mode; and, at least a component of said bending mode occurring in a reference plane, said elongated member shear center and said rod-like member shear center having a predetermined shear center misalignment, at least a component of said predetermined shear center misalignment being normal to the reference plane.

32. The method of claim 31, wherein said predetermined shear center misalignment changes with axial position along the axis of said elongated member.

33. The method of claim 31, wherein at least a component of said bending mode occurs in an additional reference plane normal to the reference plane, at least a component of said predetermined shear center misalignment being normal to the additional reference plane.

34. The method of claim 27, wherein said rod-like member has a rod-like member neutral axis for said bending mode, and said elongated member has a elongated member neutral axis for said bending mode;

said rod-like member has a rod-like member shear center for said bending mode, and said elongated member has a elongated member shear center for said bending mode;

at least a component of the bending mode occurring in a reference plane, said elongated member neutral axis and said rod-like member neutral axis having a predetermined neutral axis misalignment, with at least a component of said predetermined neutral axis misalignment being parallel to the reference plane; and, said elongated member shear center and said rod-like member shear center having a predetermined shear center misalignment, at least a component said predetermined shear center misalignment being normal to the reference plane.

35. The method of claim 34, wherein said predetermined neutral axis misalignment and said predetermined shear center misalignment change with axial position along the axis of said elongated member.

36. The method of claim 34, wherein at least a component of the bending mode occurs in an additional reference plane normal to the reference plane, at least a component of said predetermined neutral axis misalignment being parallel to the additional reference plane; and, said elongated member shear center and said rod-like member shear center having a predetermined shear center misalignment, at least a component of said predetermined shear center misalignment being normal to the additional reference plane.

37. The method of claim 27, wherein said rod-like member receives said elongated member with an interference fit resulting in said second surface pressing against said first surface.

38. The method of claim 27, wherein said elongated member has a third surface axially distributed along said elongated member, and said bending mode damper further comprises at least a second elongated member having a fourth surface engaging said third surface, and wherein said fourth surface slides against said third surface during bending of said rod-like member thereby providing coulomb damping.

39. The method of claim 38, wherein said elongated member is oriented to provide damping for bending in one plane, and said second elongated member is oriented to provide damping for bending in a different plane.

* * * * *